(12) United States Patent
Uchman

(10) Patent No.: US 6,902,325 B1
(45) Date of Patent: Jun. 7, 2005

(54) CONSTANT VELOCITY JOINT AND WHEEL HUB ASSEMBLY

(75) Inventor: Frederick Uchman, Clarkston, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 131 days.

(21) Appl. No.: 10/632,309

(22) Filed: Aug. 1, 2003

Related U.S. Application Data

(63) Continuation-in-part of application No. 10/060,106, filed on Jan. 29, 2002, now Pat. No. 6,626,581, which is a continuation-in-part of application No. 09/947,986, filed on Sep. 6, 2001, now Pat. No. 6,524,012.

(51) Int. Cl.[7] .......................... F16C 13/00; F16D 3/22
(52) U.S. Cl. .................. 384/544; 384/903; 403/1; 403/19; 403/315; 403/319; 403/397; 464/178
(58) Field of Search ................ 403/1, 19, 20, 403/397, 315, 316, 319, 355, 325; 411/517, 411/520, 521, 530; 384/544, 589, 561, 903, 384/539; 464/178, 906

(56) References Cited

U.S. PATENT DOCUMENTS

| | | | | |
|---|---|---|---|---|
| 2,440,452 A | * | 4/1948 | Smith | .......................... 411/517 |
| 2,536,424 A | * | 1/1951 | Curtis | .......................... 384/217 |
| 2,760,258 A | * | 8/1956 | Rieger | .......................... 403/326 |
| 2,865,662 A | * | 12/1958 | Nurmse | .......................... 403/325 |
| 4,602,876 A | * | 7/1986 | Miki et al. | .................. 384/585 |
| 6,193,419 B1 | | 2/2001 | Krude et al. | |
| 6,354,952 B1 | * | 3/2002 | Boulton et al. | ............. 464/145 |
| 6,412,393 B1 | * | 7/2002 | Heitz | .......................... 384/903 |

FOREIGN PATENT DOCUMENTS

| | | |
|---|---|---|
| WO | WO 99/13232 | 3/1999 |

* cited by examiner

*Primary Examiner*—Thomas R. Hannon
(74) *Attorney, Agent, or Firm*—Jennifer M. Brumbaugh; Mick A. Nylander

(57) ABSTRACT

An assembly including an outer race of a constant velocity joint and part of a vehicle wheel bearing. The outer race has a first bore with an internal groove. The wheel bearing part has a second bore with an open end, an external groove, and a slot extending axially between the external groove and the open end. The slot also opens circumferentially along its axial length towards the open end forming an angular surface. The wheel bearing part and the outer race are held in an assembled position by a spring ring engaged in the internal groove and the external groove. The spring ring includes, adjacent one end, an arm which extends generally radially inward through the slot. When twisted, the arm engages the angular surface of the slot, and contracts within the external groove.

20 Claims, 5 Drawing Sheets

CONSTANT VELOCITY JOINT AND WHEEL HUB ASSEMBLY

CROSS REFERENCE TO RELATED APPLICATION

This is a Continuation-In-Part of U.S. application Ser. No. 10/060,106 filed Jan. 29, 2002 entitled "Constant Velocity Joint And Wheel Hub Assembly" now U.S. Pat. No. 6,626,581, which is a Continuation-In-Part of U.S. application Ser. No. 09/947,986 filed Sep. 6, 2001 entitled "Securing Members Together By Spring Rings" now U.S. Pat. No. 6,524,012.

TECHNICAL FIELD

This invention relates generally to a mechanism for securing together against relative axial movement two members in telescopic relation. The members are secured together by a spring ring which is received in cooperating grooves; an internal groove in the external member and an external groove in the internal member. In particular, the invention relates to securing together the outer race of a constant velocity joint and part of a motor vehicle wheel bearing as well as a device for sealing the interface between the outer race and wheel bearing hub.

BACKGROUND OF THE INVENTION

Various proposals have been made for securing together the outer race of a constant velocity joint and part of a motor vehicle wheel bearing. Attention is drawn to U.S. Pat. No. 6,022,275 issued Feb. 8, 2000 to SKF Industrie S.p.A. and U.S. Pat. No. 6,193,419 issued Feb. 27, 2001 to GKN Automotive AG. Reference is also made to the publication WO99/13232 in the name of GKN Automotive AG. In this latter publication a spring ring is used which has arms at its ends which extend outwardly and these arms are embraced by a holding element which can hold the ring in one of the grooves while the parts are assembled and then removed to allow the ring to engage both grooves. Access to the holding element may be through the hole in the vehicle suspension knuckle which is normally used for an ABS sensor.

The area around the exterior of the wheel bearing is very confined and there is little space to manipulate the holding element. Thus, there exists a need for an improved securing mechanism.

SUMMARY OF THE INVENTION

The present invention provides an arrangement in which, when securing together the outer race of a constant velocity joint and a wheel bearing by means of a spring ring, the spring ring can be operated upon from the wheel side of the assembly and can thus allow easy assembly and disassembly of the parts in situ on a vehicle.

According to one aspect of the invention, a method of securing together, by means of a spring ring, an external member in telescopic relation with an internal member is provided. The external member has a first bore and an internal groove in the first bore, and the internal member has an external groove, a second bore and a slot extending radially of the second bore between an inner end open to the second bore and an outer end at the external surface of the internal member, the slot extending axially between the external groove and an end of the internal member. The slot expands circumferentially as it extends from the external groove to the end of the internal member. The spring ring is engaged in the grooves to secure the members together and has, adjacent to one end, an arm which extends generally radially inwardly. The method includes mounting the spring ring in the external groove so that the arm extends inwardly through the slot into the second bore, releasably holding the ring in a contracted state so that it lies substantially within the external groove by engaging the arm in the second bore with a holding device, telescoping the members together while the arm is engaged with the holding device until the grooves in the members are mutually aligned, and disengaging the holding device from the arm to release the ring so that the ring expands to engage in both of the mutually aligned grooves to secure the members together.

The holding device can be a forked tool or long-nosed pliers. The external member can be part of the outer race of a constant velocity joint and the internal member can be part of a motor vehicle wheel bearing.

According to another aspect of the invention an assembly of an outer race of a constant velocity joint and part of a motor vehicle wheel bearing is provided. The outer race has a first bore and an internal groove in the bore. The bearing part and the outer race are held in assembled position by a spring ring engaged in the internal groove and in an external groove of the bearing part which has a second bore with an open end. The ring has an arm at one end which extends generally radially inwardly through a slot extending radially of the second bore between an inner end open to the second bore and an outer end at the external surface of the bearing part. The slot extends axially between the external groove and an end of the bearing part and expands circumferentially as it extends from the external groove and the end of the bearing part.

In this arrangement the inwardly projecting arm of the ring can be operated upon through the open end of the second bore and can be gripped so as to locate the ring wholly in the external groove on the wheel hub part or to allow the ring to expand so as to be located in both the internal and the external grooves.

In another embodiment, an assembly having a telescoping internal and external member held together by a spring ring is provided. The internal member has an annular flange, the flange including an external annular groove and a slot extending axially and opening circumferentially from the external groove to an open end of the internal member to define an angled surface. The external member has a tubular neck portion including an internal annular groove, wherein the neck portion is adapted to telescopically surround the flange. The spring ring engages the internal annular groove and the external annular groove for preventing relative axial displacement between the telescoping internal and external members. The spring ring includes an arm at one end which extends generally radially inward through the slot and approximately through a center of the spring ring.

Other advantages of the invention will become apparent upon reading the following detailed description and appended claims, and upon reference to the accompanying drawings.

BRIEF DESCRIPTION OF THE DRAWINGS

The invention will now be described in detail with reference to the accompanying drawings which show various assemblies of a constant velocity joint outer race and a motor vehicle wheel bearing embodying the invention.

In the drawings.

DETAILED DESCRIPTION OF THE INVENTION

Figure 1:
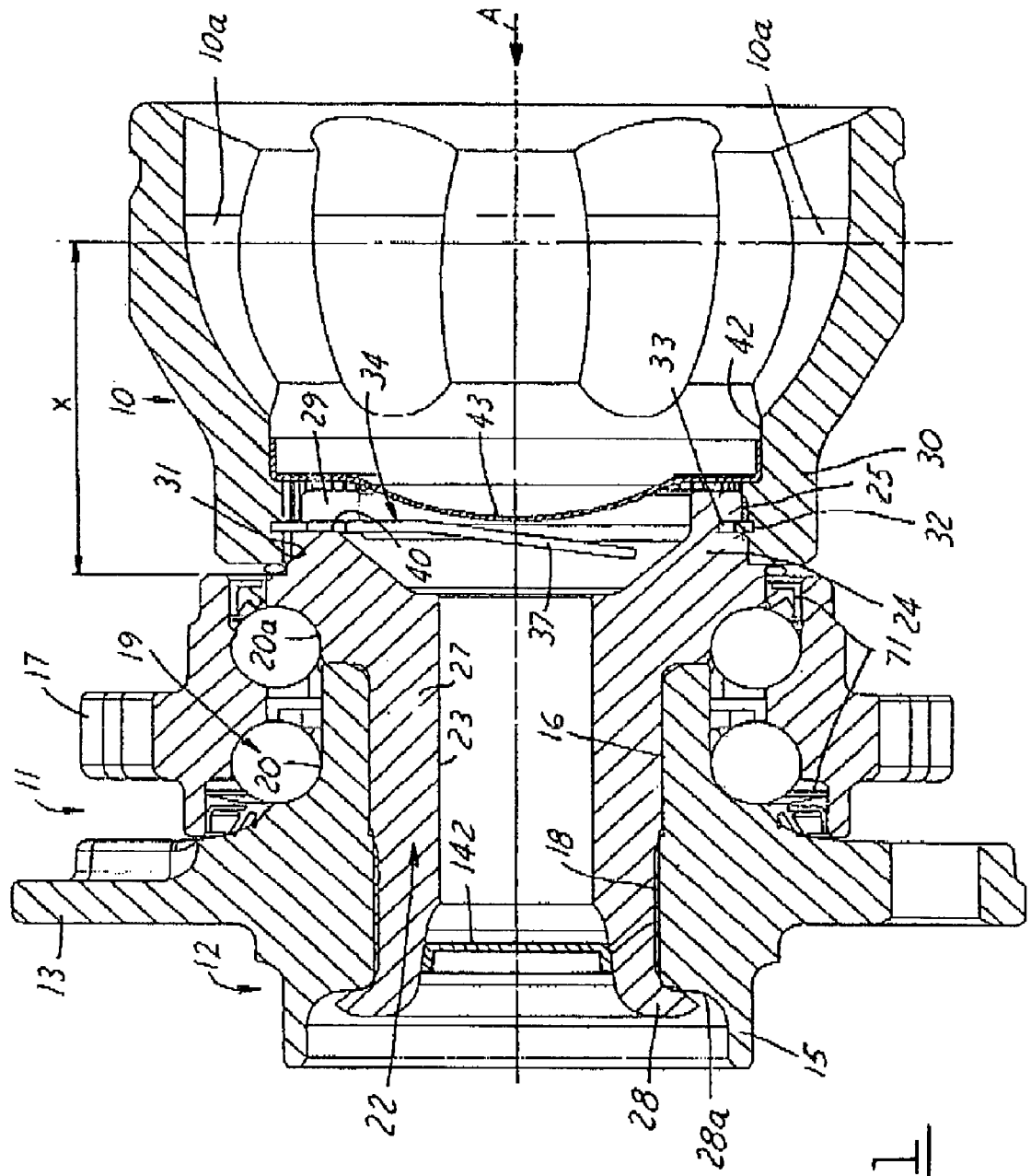
FIG. 1 is a longitudinal cross-section through a wheel bearing and outer race of a CV joint assembly according to one embodiment of the invention.

Referring first to FIG. 1, there is shown an assembly of the outer race 10 of a constant velocity joint and a motor vehicle wheel bearing assembly indicated generally at 11. The assembly 11 includes a hub 12 having a flange 13 which carries bolts (not shown) to receive a vehicle road wheel (not shown) which is located on a spigot 15. The hub has a bore 16 and is rotatably mounted in a fixed part 17 which may be connected by bolts, not shown, to a suspension knuckle of a vehicle. There is a rolling element bearing 19 between the hub 12 and the fixed part 17. In the example shown, the bearing is a double-ball bearing, but may alternatively be a roller bearing. The outer races of the bearing are formed directly in the fixed part 17. The inner race of one of the bearing rows is indicated at 20 and is formed on the hub itself. The inner race of the other bearing row is indicated at 20a and is formed on a tubular securing element 22.

The tubular securing element 22 has a bore 23 and serves to pre-load the bearing 19 via the bearing race 20a and to locate the hub 12. At its right-hand end in FIG. 1, the securing element has a flange 24, the outer surface of which is splined at 25. A tubular part 27 of the securing element passes through the bore 16 of the hub and at its left-hand end is swaged outwardly at 28 to engage a surface 28a on the hub. The bore 16 of the hub 12 and the tubular part 27 of the securing element also have inter-engaging splines 18. As the swaging takes place, a load is applied to the securing element so that it loads the bearing race 20a and thus pre-loads the bearing 19. Other bearing configurations are also contemplated. For example, the inner race 20a in FIG. 1, which is formed on the securing element 22, can be replaced by a separate inner bearing race which can be located on a seat on the flange 24. In such a case, the bearing 19 is pre-loaded via the bearing race as the left-hand end of the securing element is swaged over at 28. Oil seals such as 71 in FIG. 1 may be installed on each side of the bearings 19.

The outer race 10 of the constant velocity joint has ball tracks 10a and a tubular neck portion 30 defining an opening which is internally splined at 31. The splines 31 in the neck portion of the outer race engage the splines 25 on the flange 24. The outer race 10 will also contain an inner race, cage and balls (not shown).

Figure 2:
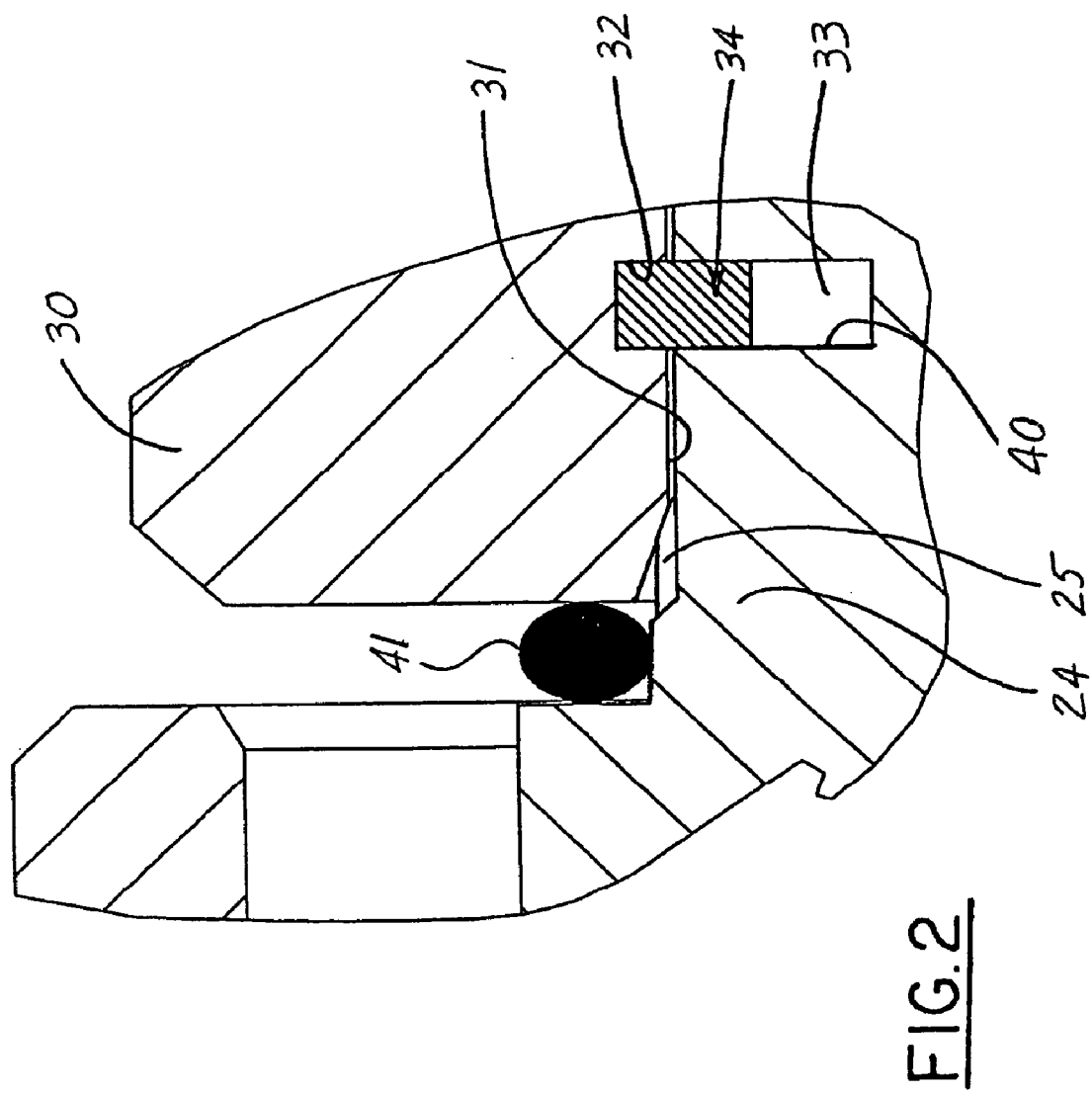
FIG. 2 shows a detail of FIG. 1 showing the sealing ring and how the spring ring engages the internal and external grooves.
Figure 2A:
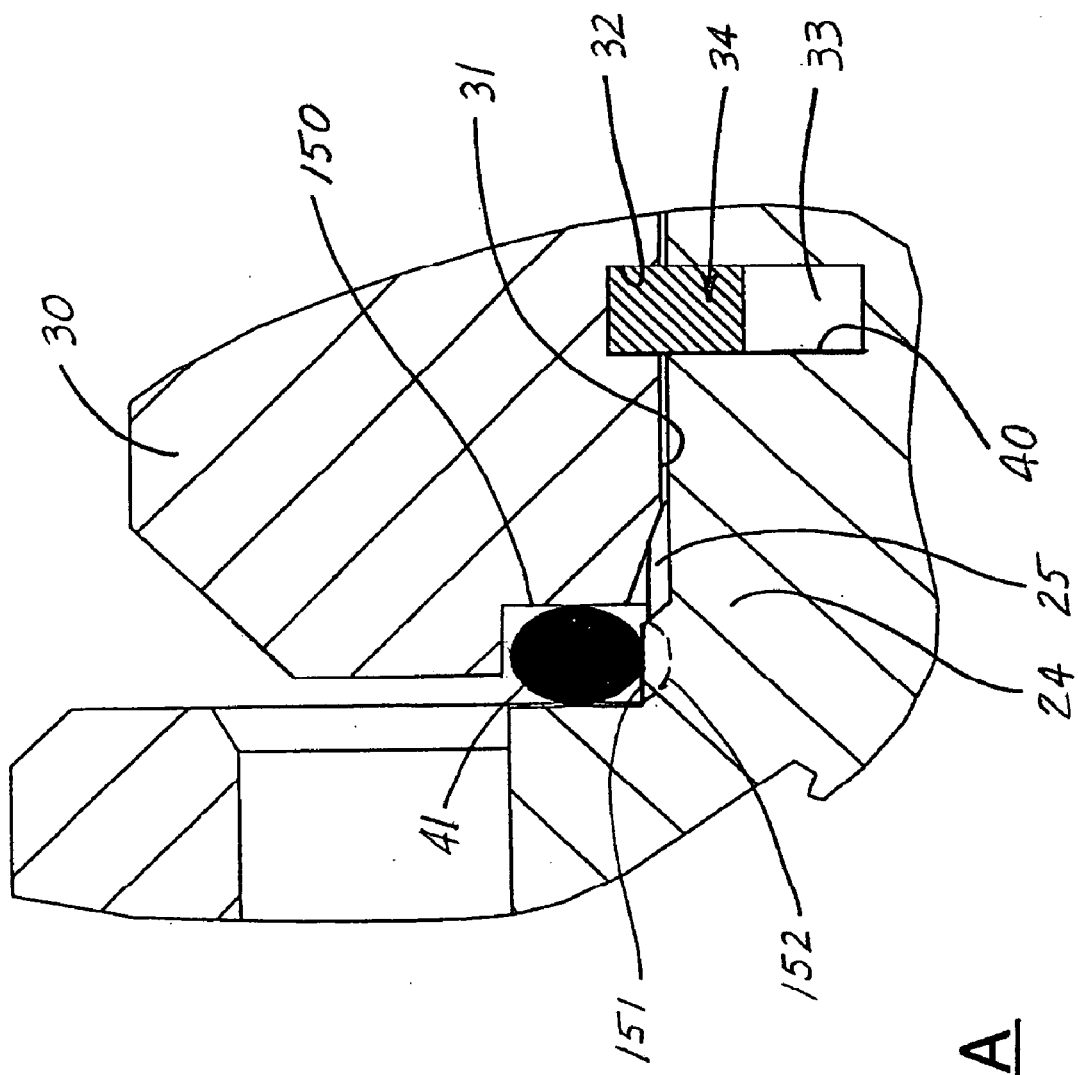
FIG. 2A shows a detail, similar to FIG. 2, of an alternate sealing configuration for the outer race and neck portion.

Referring to FIG. 2, the neck portion 30 of the outer race is provided with an internal groove 32 while the flange 24 is provided with an external groove 33. A spring ring 34 secures the parts together by engaging the internal groove 32 and external groove 33. If desired, there may be an O-ring seal 41 interposed between the flange 24 and the adjacent end of the portion 30 to exclude dirt, etc. from the inter-engaging splines 25 and 31 and the grooves 32 and 33. The spring ring used will normally be of rectangular cross-section as shown in FIG. 2 and will normally have a greater dimension radially than axially. The O-ring 41 may also be of rectangular cross-section. FIG. 3A shows an alternate sealing arrangement for the neck portion 30 and the flange 24 wherein the O-ring 41 is engaged by an internal annular groove 150 at the end of the neck portion 30. The external shoulder 151 of the flange 24 can also include an annular recess 152, shown in broken lines, for sealing the O-ring seal 41 on the flange 24.

Referring again to FIG. 1, the cavity 42 in the outer race 10 is sealed by a diaphragm 43, and the left-hand end of the bore 23 can be sealed by a removable cap 142. Other sealing mechanisms are also contemplated for the cap 142. For example, a threaded plug, resilient plug or other removable sealing member could be used.

The flange 24 of the wheel bearing assembly can result from other wheel bearing configurations as well. For example, the hub 12 can extend to the right of the bearings 19 and the tubular securing element 22 can be eliminated. In such a case, the hub 12 would include a bore similar to bore 23 and be swaged outwardly at its right hand end to pre-load the bearings with a bearing race and a securing ring. The securing ring thus would be the splined flange on which the outer race 10 would be secured. Thus, various configurations are contemplated for the wheel bearing assembly, one example of which is shown in FIG. 1. The present invention, however, may be advantageously employed in all embodiments where an externally grooved annular flange 24 and internally grooved annular collar, such as the neck 30 are to be axially secured relative to each other.

Figure 3:
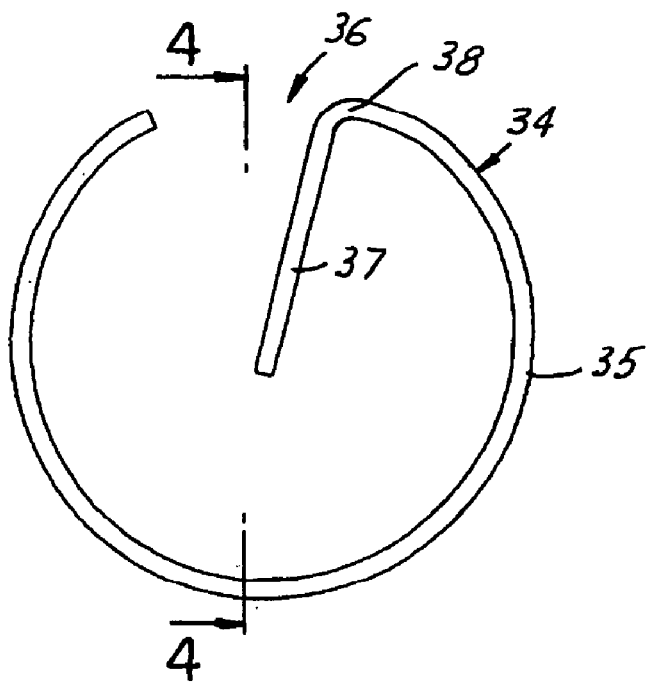
FIG. 3 is a front elevation of the spring ring for use in the various embodiments.
Figure 4:
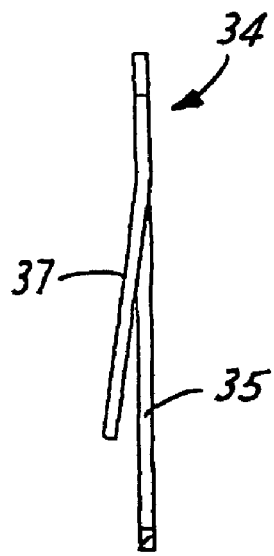
FIG. 4 is a section of the ring of FIG. 3 on the line 4—4 of FIG. 3.

The spring ring 34 is shown in more detail in FIGS. 3 and 4. The spring ring 34 includes a generally circular part 35 which is not a complete circle but has a gap 36. At one end 38 of the circular part 35, the ring has an arm 37 which projects generally radially inwardly. As shown in FIG. 4, the arm 37 can lie in a plane which is inclined to the plane which contains the circular portion 35. However, the arm could also be in the same plane as the rest of the spring ring 34. The spring ring 34 has a generally rectangular cross-section as shown in FIG. 2, and is preferably made of metal, although plastic, fibreglass, or other materials could also be used. The ring has a circumference greater than the circumference of the flange 24 such that, in operation, it will be biased into the internal groove 32 of the neck portion 30 of the outer race 10 of the CV joint. The radial width of the circular part 35 is such that it also engages a portion of the external groove 33 of the flange 24 to prevent relative axial displacement between the flange 24 and the neck portion 30. The spring ring 34 elastically deforms to contract within the external groove 33 for assembly and disassembly, and expands at rest to engage with the internal and external grooves 32, 33.

Figure 5:
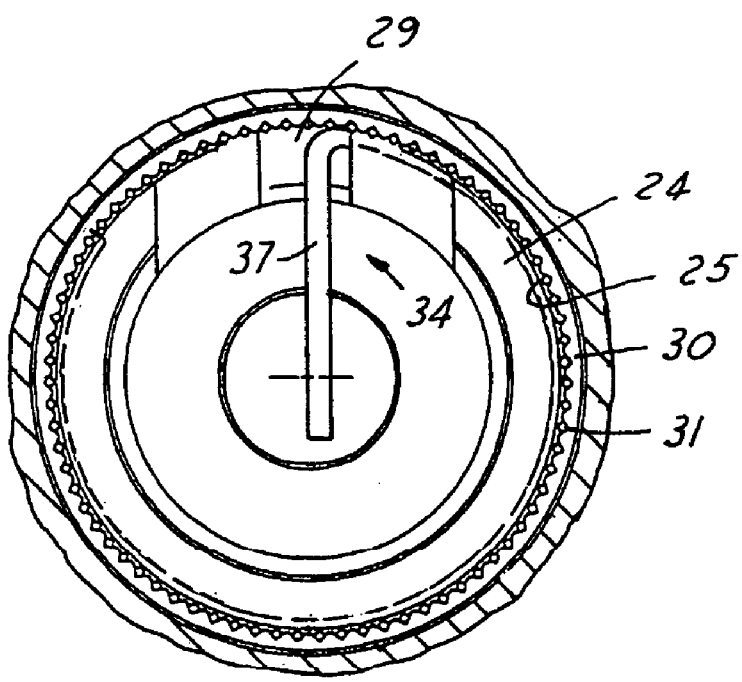
FIG. 5 is a view of the assembly of FIG. 1 in the direction of the arrow A with the internal diaphragm removed.

As shown in FIGS. 1 and 5, the flange 24 is provided with a slot 29. The slot extends radially from the bore 23 to the outer surface 25 of the flange 24. It also extends from the right-hand end of the flange 24 in FIG. 1 to the left-hand end 40 of the groove 33 in the flange (FIG. 2). To assemble the parts 10 and 11, the ring 34 is first assembled on the flange 24 so that it is received in the groove 33. The arm 37 passes inwardly into the bore 23 through the slot 29.

Figure 6:
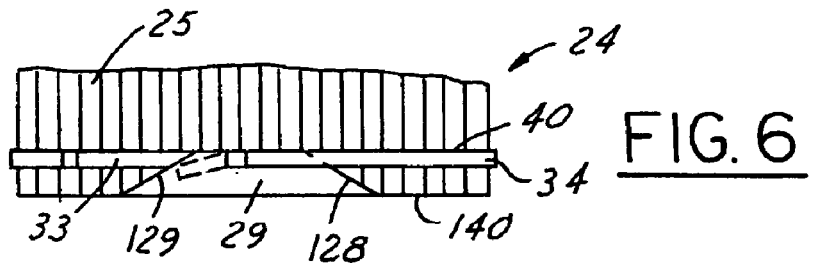
FIG. 6 is a top view of a portion of the wheel hub flange detailing one configuration of the slot.

Further details of the slot 29 are shown in FIG. 6. FIG. 6 is a partial top view of the flange 24 of the wheel bearing assembly 11. As can be seen in FIG. 6, the slot 29 extends from the inner most edge 40 of the groove 33 to the end face 140 of the flange 24. From the groove 33 to the end face 140, the slot 29 circumferentially expands to create bevelled or angled surfaces 128, 129. The surfaces can be flat as shown, or curved.

Figure 7:
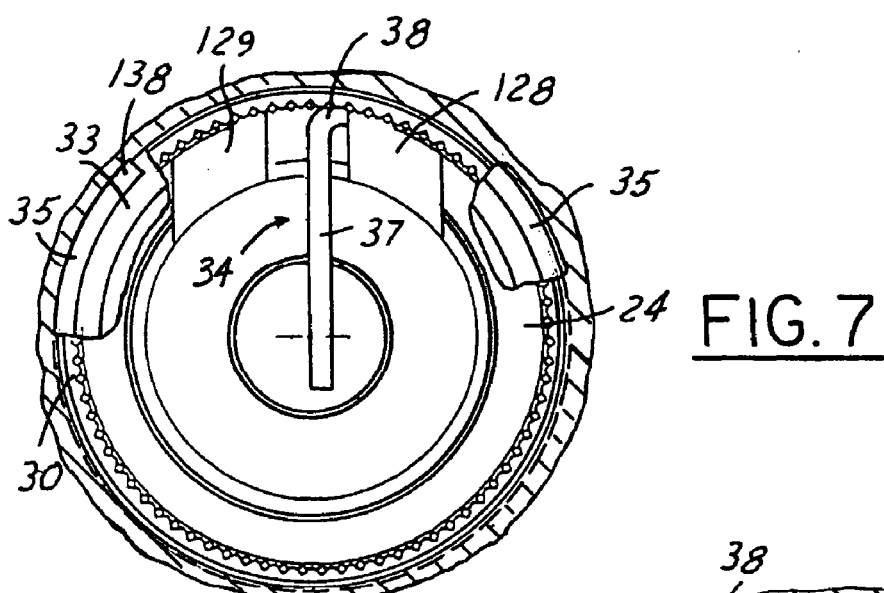
FIG. 7 is a view of the assembly of FIG. 1 in the direction of arrow A with the internal diaphragm removed and showing partial sectional details of the spring ring in the grooves at rest.
Figure 8:
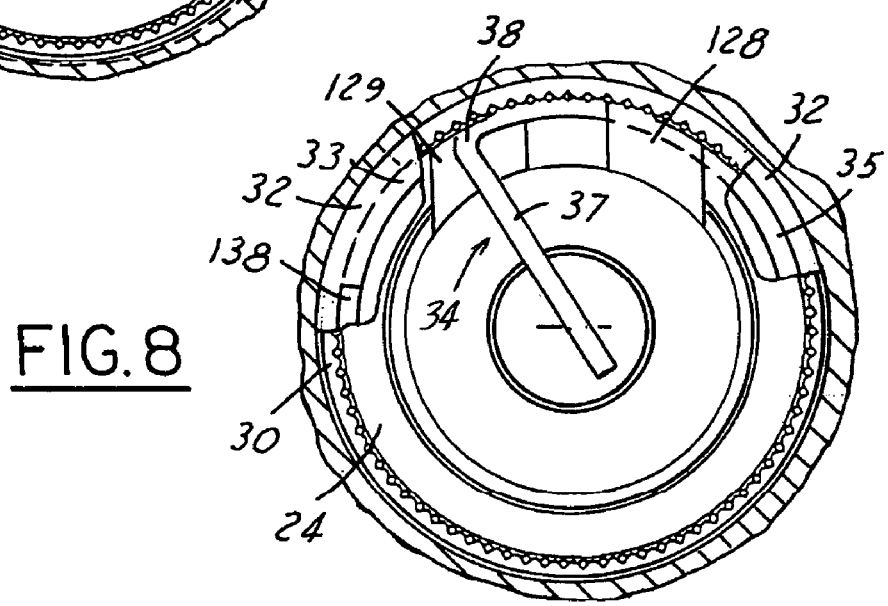
FIG. 8 is a view of the assembly of FIG. 1 in the direction of arrow A with the internal diaphragm removed and showing partial sectional details of the spring ring in the groove while contracted.

The operation of the spring ring 34, slot 29 and grooves 32, 33 will be explained with reference to FIGS. 7 and 8. FIGS. 7 and 8 show a partial end view of the assembly of FIG. 1 in the direction of arrow A with the internal diaphragm 43 removed and with partial sections in the region of the spring ring 34 and grooves 32, 33. FIG. 7 shows the spring ring 34 in the assembled state and FIG. 8 shows the spring ring in the contracted state for assembly/disassembly of the end portion 30 of the outer race 10 and flange 24 of the wheel bearing assembly 11.

By way of a pair of long-nosed pliers or a forked tool, inserted into the bore 23 from the left-hand end (FIG. 1), the arm 37 can be moved towards the second end 138 of the spring ring 34 thereby contracting the circular part 35 of the ring 34 so that the ring 34 is wholly located in the groove 33. As the first end 38 is rotated towards the second end 138, the first end 38 engages the angled surface 129 of the slot 29. The angled surface 129 bends the end 38 toward the open end of the flange 24. Further rotation of the arm 37 and first end 38 towards the second end 138 of the ring 34 results in the circular portion 35 of the ring 34 being entirely within the external groove 33 of the flange 24 as shown in FIG. 8. The outer race 10 can then be slid onto the flange 24 so that the splines 25 and 31 engage and the parts can be moved axially relative to one another until the grooves 32 and 33 are in alignment. The arm 37 can then be released or turned in the opposite direction with the result that the ring 34 assumes the position shown in FIG. 7 and the parts are secured together.

To remove the outer race 10 from the bearing assembly long-nosed pliers, a forked tool, or the like are again inserted into the bore 23 from the left-hand end, which is the wheel side on the vehicle, and the arm 37 is gripped to contract the ring into the groove 33 thus allowing the outer race 10 to be removed. If this is unsuccessful, further rotation of the arm 37 results in the body 35 of the spring ring 34 passing along the angled surface 129 until, eventually, the entire spring ring 34 is removed from the grooves 32, 33. At such time, the outer race 10 can be removed. This is a convenient method of assembly and disassembly since it is carried out from the wheel side of the assembly making it is possible to disassemble the bearing and the CV joint outer race when the assembly is in situ on a vehicle. It is also possible to reduce the distance X shown in FIG. 1 between the center line of the CV joint outer race and the bearing by this construction. The cap 142 keeps dirt out of the bore 23 and can be removed to insert pliers or a tool to compress the ring 34.

From the foregoing, it can be seen that there has been brought to the art a new and improved method of securing members together by spring rings which has advantages over prior designs. While the invention has been described in connection with one or more embodiments, it should be understood that the invention is not limited to those embodiments. Thus, the invention covers all alternatives, modifications, and equivalents as may be included in the spirit and scope of the appended claims.

What is claimed is:

1. An assembly comprising:
   an internal member having annular flange, the flange including an external annular groove, and a slot extending axially and opening circumferentially from said external groove to an open end of the internal member to define an angled surface;
   an external member having a tubular neck portion including an internal annular groove, the neck portion adapted to telescopically surround the flange; and
   a spring ring engaged in said internal annular groove and said external annular groove for preventing relative axial displacement between said telescoping internal and external members, the spring ring having an arm at one end which extends generally radially inward through said slot and approximately through a center of said spring ring.

2. An assembly according to claim 1 wherein said slot comprises a first angled surface opposite the arm end of said spring ring.

3. An assembly according to claim 1 wherein said slot comprises first and second angled surfaces, said surfaces opening circumferentially from said external groove to said open end.

4. An assembly according to claim 3 wherein one of said first and second angled surfaces provides a bearing surface for engaging the arm end of said spring ring.

5. An assembly according to claim 1 wherein said flange and said neck portion have inter-engaging splines.

6. An assembly comprising an outer race of a constant velocity joint and part of a vehicle wheel bearing, wherein the outer race has a first bore and an internal annular groove in the bore, and wherein the wheel bearing part has a second bore with an open end, an external annular groove, and a slot extending radially from an inner surface of the second bore to an external surface of the bearing part, the slot extending axially and opening circumferentially from said external groove to said open end, the wheel bearing part and the outer race being held in an assembled position by a spring ring engaged in said internal annular groove and said external annular groove, the spring ring having an arm at one end which extends generally radially inward through said slot and approximately through a center of said spring ring.

7. An assembly according to claim 6 wherein said slot comprises a first angled surface opposite the arm end of said spring ring.

8. An assembly according to claim 6 wherein said slot comprises first and second angled surfaces, said surfaces opening circumferentially from said external groove to said open end.

9. An assembly according to claim 8 wherein one of said first and second angled surfaces provides a bearing surface for engaging the arm end of said spring ring.

10. An assembly according to claim 6 wherein said first bore of the outer race and said external surface of the bearing part have inter-engaging splines.

11. An assembly according to claim 6 wherein said spring ring, at rest, includes a gap between the arm end and the other end of the spring ring.

12. An assembly according to claim 6 wherein the circumference of said spring ring, at rest, is greater than the circumference of the external surface of the bearing part.

13. An assembly according to claim 6 wherein the radial width of the spring ring is less than the depth of the external annular groove.

14. An assembly according to claim 13 wherein the radial width of the spring ring is greater than the depth of the internal annular groove.

15. An assembly according to claim 6 wherein the spring ring defines an open-ended circular body, and the arm is angled with respect to a plane containing the spring ring body.

16. In an assembly comprising an external member having a first bore and an internal annular groove in the first bore, an internal member having an external annular groove, a second bore and a radial slot extending axially and opening circumferentially from said external groove to an open end of the internal member to define an angled surface, and a spring ring having an arm at one end which extends generally radially inward and approximately through a center of said spring ring, a method of securing together the external member in telescopic relationship with the internal member by the spring ring comprising:

mounting the spring ring in the external groove of the internal member so that the arm extends inwardly through said slot into the second bore and the other end of said spring ring is within said external groove;

engaging said arm with a tool and rotating said arm towards said other end of said spring ring to releasably hold the spring ring in a contracted state so that it lies substantially within the external groove;

telescoping the internal member into the external member while the arm is engaged and rotated towards the other end of the spring ring until the internal and external grooves are mutually aligned; and releasing the arm of the spring ring so that the spring ring expands to engage both of the mutually aligned internal and external grooves.

17. A method according to claim 16 wherein the second bore has an open end and the tool is inserted into the second bore through the open end.

18. A method according to claim 16 wherein said tool is a forked tool and said arm is engaged by receiving said arm in the forked portion of said tool.

19. A method according to claim 16 comprising, after the spring ring has expanded to engage both of said internal and external grooves, inserting a sealing element into the second bore.

20. A method according to claim 16 wherein the step of rotating said arm includes rotating said arm to engage said angled surface of said slot.

\* \* \* \* \*